United States Patent
Zhou et al.

(10) Patent No.: US 7,400,782 B2
(45) Date of Patent: Jul. 15, 2008

(54) IMAGE WARPING CORRECTION IN FORMING 360 DEGREE PANORAMIC IMAGES

(75) Inventors: Lingxiang Zhou, Fremont, CA (US); Yushan Huang, Zhejiang (CN)

(73) Assignee: ArcSoft, Inc., Fremont, CA (US)

( * ) Notice: Subject to any disclaimer, the term of this patent is extended or adjusted under 35 U.S.C. 154(b) by 571 days.

(21) Appl. No.: 10/230,786

(22) Filed: Aug. 28, 2002

(65) Prior Publication Data

US 2004/0042685 A1     Mar. 4, 2004

(51) Int. Cl.
*G06K 9/36* (2006.01)
(52) U.S. Cl. .................. 382/284; 382/289; 382/294; 382/296; 345/649; 348/580
(58) Field of Classification Search .................. 382/284
See application file for complete search history.

(56) References Cited

U.S. PATENT DOCUMENTS

| | | | |
|---|---|---|---|
| 4,090,174 A | | 5/1978 | Van Voorhis |
| 4,183,162 A | * | 1/1980 | Applebaum et al. ........... 40/530 |
| 4,197,004 A | * | 4/1980 | Hurlbut ........................ 355/53 |
| 5,450,604 A | | 9/1995 | Davies |
| 5,742,710 A | | 4/1998 | Hsu et al. .................... 382/236 |
| 5,790,206 A | | 8/1998 | Ju |
| 5,987,164 A | * | 11/1999 | Szeliski et al. ............... 382/154 |
| 6,078,701 A | * | 6/2000 | Hsu et al. .................... 382/294 |
| 6,097,854 A | | 8/2000 | Szeliski et al. |
| 6,128,108 A | | 10/2000 | Teo |
| 6,157,747 A | | 12/2000 | Szeliski et al. ............... 382/284 |
| 6,192,156 B1 | | 2/2001 | Moorby ....................... 382/236 |
| 6,249,616 B1 | * | 6/2001 | Hashimoto ................... 382/284 |

(Continued)

FOREIGN PATENT DOCUMENTS

WO    WO-03/091948 A1    11/2003

OTHER PUBLICATIONS

Kang, S.B., Weiss, R., "Characterization of Errors in Compositing Panoramic Images", Computer Vision and Pattern Recognition, 1997. Proceedings., 1997 IEEE Computer Society Conference on, Jun. 17-19, 1997, ISBN: 0-8186-7822-4.*

(Continued)

*Primary Examiner*—Matthew C. Bella
*Assistant Examiner*—Sath V. Perungavoor
(74) *Attorney, Agent, or Firm*—Patent Law Group LLP; David C. Hsia

(57) ABSTRACT

A method for creating a 360 degree panoramic image from multiple images includes (1) computing a gross rotation error $\Delta R$ between a first image and a calculated first image rotated to be stitched to a last image, and (2) spreading the gross rotation error $\Delta R$ to each pixel on the panoramic image. Spreading the gross rotation error $\Delta R$ includes (1) computing a rotation angle $\theta_0$ and rotational axis $n_0$ from the gross rotational error $\Delta R$, (2) determining an angle $\alpha$ of each pixel, and (3) determining a compensation matrix $R_c$ for each pixel using the following formula: $R_c(\alpha)=R(\alpha/2\pi\theta_0)$. Spreading the gross rotation error $\Delta R$ further includes (4) tracing a pixel on the panoramic image to a camera optical center of the images to form a first ray, (5) determining a second ray originating from the camera optical center that would be rotated by the compensation matrix $R_c$ to coincide with the first ray, (6) tracing the second ray to a second pixel on one of the images, and (7) painting the first pixel with color values of the second pixel.

5 Claims, 3 Drawing Sheets

U.S. PATENT DOCUMENTS

| | | | |
|---|---|---|---|
| 6,359,617 B1 * | 3/2002 | Xiong | 715/848 |
| 6,385,349 B1 | 5/2002 | Teo | |
| 6,393,162 B1 * | 5/2002 | Higurashi | 382/284 |
| 6,404,516 B1 * | 6/2002 | Edgar | 358/487 |
| 6,434,265 B1 * | 8/2002 | Xiong et al. | 382/154 |
| 6,456,323 B1 | 9/2002 | Mancuso et al. | |
| 6,507,665 B1 * | 1/2003 | Cahill et al. | 382/154 |
| 6,532,037 B1 | 3/2003 | Shimura | |
| 6,587,597 B1 * | 7/2003 | Nakao et al. | 382/284 |
| 6,643,413 B1 * | 11/2003 | Shum et al. | 382/284 |
| 6,646,655 B1 | 11/2003 | Brandt et al. | |
| 6,912,325 B2 * | 6/2005 | Rombola et al. | 382/289 |
| 6,978,051 B2 | 12/2005 | Edwards | |
| 7,085,435 B2 | 8/2006 | Takiguchi et al. | |
| 7,194,112 B2 * | 3/2007 | Chen et al. | 382/106 |
| 2002/0006217 A1 * | 1/2002 | Rubbert et al. | 382/131 |
| 2002/0181802 A1 * | 12/2002 | Peterson | 382/284 |
| 2002/0191865 A1 | 12/2002 | Yamaguchi et al. | |
| 2003/0197780 A1 * | 10/2003 | Iwaki et al. | 348/36 |
| 2003/0235344 A1 * | 12/2003 | Kang et al. | 382/284 |
| 2005/0089244 A1 | 4/2005 | Jin et al. | |

OTHER PUBLICATIONS

Correlation (ESSI-CNES-INRIA report Bernard Holtz 1991) (2 pages).

Les Kitchen et al., "Gray-level corner detection," Pattern Recognition Letters 1 (1982) 95-102.

Yalin Xiong et al, "Registration, Calibration And Blending In Creating High Quality Panoramas," Applications of Computer Vision, 1998. WACV '98 Proceedings, Fourth IEEE Workshop On Princeton, NJ Oct. 19-21, 1998, Los Alamitos, CA, USA, IEEE Comput. Soc., Oct. 19, 1998, pp. 69-74.

Yang Linhong et al, "A Stitching Algorithm Of Still Pictures With Camera Translation," Proceedings First International Symposium On Cyber Worlds IEEE Comput. Soc. Los Alamitos, CA, USA, 2002, pp. 176-182.

Chia-Yen Chen et al, "Image Stitching—Comparisons And New Techniques," Computer Analysis Of Images And Patterns. 8th International Conference, CAIP '99. Proceedings (Lecture Notes In Computer Science vol. 1689) Springer-Verlag Berlin, Germany, 1999, pp. 615-622.

Dae-Hyun Kim et al, "An Efficient Method To Build Panoramic Image Mosaics," Pattern Recognition Letters, vol. 24, No. 14, Oct. 2003, pp. 2421-2429.

PCT International Search Report, pp. 1-4, 2004.

PCT Written Opinion Of The International Searching Authority, pp. 1-5, 2004.

Satya Prakash Mallick, "Feature Based Image Mosaicing", Department of Electrical and Computer Enginering, University of California, San Diego, paper, 6 pages, 2002.

U.S. Appl. No. 09/665,917, filed Sep. 20, 2000, entitled: "Image Matching Using Resolution Pyramids with Geometric Constraints", 45 pages.

* cited by examiner

IMAGE WARPING CORRECTION IN FORMING 360 DEGREE PANORAMIC IMAGES

FIELD OF THE INVENTION

This invention relates to digital image stitching and in particular to an image stitching method for generating a 360 degree panoramic image from a sequence of images.

DESCRIPTION OF RELATED ART

Digital photography is becoming more popular today as digital cameras and scanners are becoming widely available. Digital images can be created either by capturing a scene using a digital camera or digitizing a traditional film-based photograph using a scanner. One particular advantage of digital photography over traditional film-based photography is that digital images can be easily manipulated or edited for better presentation. Digital photography can also be readily distributed over the Internet.

When a photographer captures a scene using a camera, the desired field of view may be larger than the normal field of view of the camera. Digital photography allows a panoramic image to be produced without the need of purchasing special equipment such as a panoramic camera or fisheye lenses. For example, a photographer with a digital camera may capture a series of digital pictures of a scene by rotating the camera and taking pictures in a sequence of different directions. The captured images may then be stitched together to produce a panoramic picture of the scene. Similarly, film-based photographs can be digitized, and the panoramic picture can be composed by stitching together the digitized images. Presently, digital image programs are available for stitching multiple digital images together to form a panoramic picture. Exemplary programs include Ulead Cool 360™, Live Picture PhotoVista™, and MGI PhotoSuite III™.

Typically a conventional image program stitches images by matching corresponding features on two source images and rotating one source image so the corresponding features overlap. For example, a 360 degree panoramic image is constructed from a sequence of many images where the last image is stitched to the first image to complete the 360 degree view. However, errors (e.g., matching and motion estimation errors) cause a gap between the last image and the first image that must be compensated so they can be stitched together. Therefore, there is a need for a method to compensate these errors in a reasonable way so the last image can be stitched to the first image.

SUMMARY OF THE INVENTION

In one embodiment, a method for creating a 360 degree panoramic image from multiple images includes (1) computing a gross rotation error ΔR between a first image and a calculated first image rotated to be stitched to a last image, and (2) spreading the gross rotation error ΔR to each pixel of the panoramic image. In one embodiment, spreading the gross rotation error ΔR includes (1) computing a rotation angle $\theta_0$ and rotational axis $n_0$ from the gross rotational error ΔR, (2) determining an angle α of each pixel, and (3) determining a compensation matrix $R_c$ for each pixel using the following formula:

$$R_c(\alpha) = R\left(\frac{\alpha}{2\pi}\theta_0\right).$$

In one embodiment, spreading the gross rotation error ΔR further includes (4) tracing a pixel in a column on the panoramic image to a camera optical center of the images to form a first ray, (5) determining a second ray originating from the camera optical center that would be rotated by the compensation matrix $R_c$ to coincide with the first ray, (6) tracing the second ray to a second pixel on one of the images, and (7) painting the first pixel with color values of the second pixel.

DETAILED DESCRIPTION

In one embodiment of the invention, a computer generates a 360 degree panoramic image by determining the focal length of the camera, matching feature points between adjacent images, and using the focal length and the feature points to determine the positions of the adjacent images around a fixed camera optical center. The computer assumes that the adjacent images are taken by a camera rotated from the fixed camera optical center. After the images are arranged about the camera optical center, their pixels can be projected onto a cylindrical surface (or vice versa) to generate the 360 degree panoramic image. For additional details regarding determining the focal length, matching feature points, and determining the position of adjacent images, please see U.S. patent application Ser. No. 09/665,917, filed Sep. 20, 2001, which is incorporated by reference in its entirety.

Figure 1:
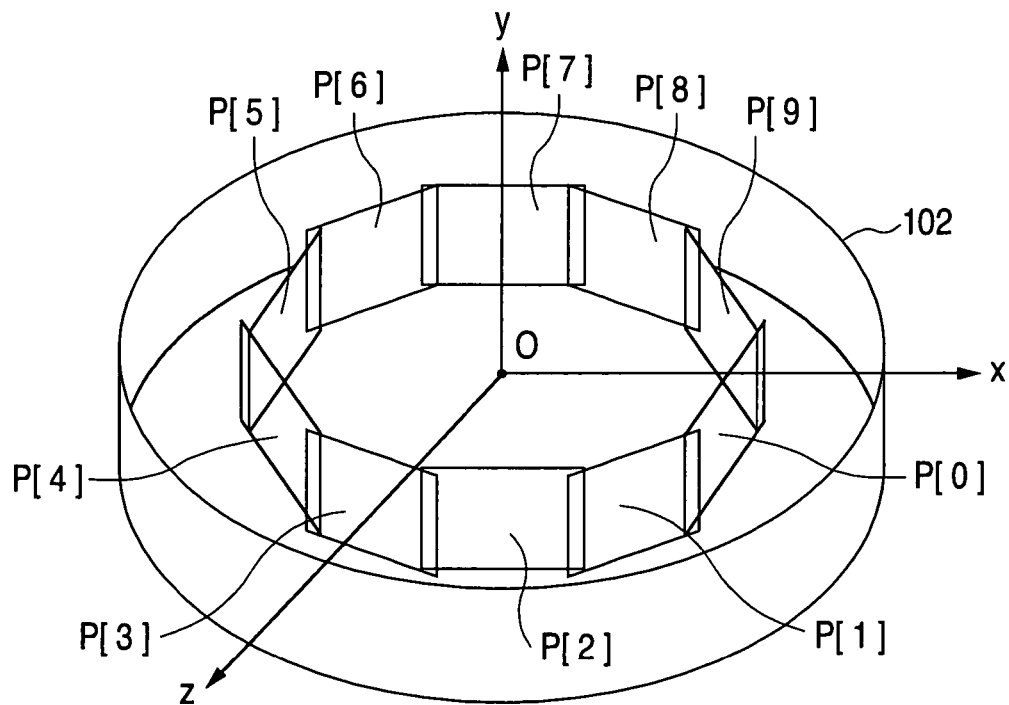
FIG. 1 illustrates a diagram of a sequence of stitched images to be projected on a cylindrical surface to generate a 360 degree panoramic image in one embodiment of the invention.

FIG. 1 illustrates an exemplary sequence of images P[0], P[1], . . . , P[9] arranged around a camera optical center O in one embodiment of the invention. Camera optical center O is also the origin of a coordinate system XYZ. The pixels of images P[0] to P[9] can be projected onto a cylindrical surface 102 to generate a 360 degree panoramic image. Although ten images are shown, any number of images around the origin O may be used.

The relative rotation matrices between adjacent images P[0] and P[1], P[1] and P[2], . . . , and P[8] and P[9] can be defined as $R_{H[0]}, R_H[1], \ldots,$ and $R_H[9]$, where "R" means "rotation" and "H" means the rotation is a relative motion in the horizontal direction. The absolute rotation matrices for images P[0], P[1], . . . , and P[9] can be defined as R[0], R[1], . . . , and R[9]. Accordingly, R[0]=I
R[1]=$R_H[0]$\*R[0]
R[2]=$R_H[1]$\*R[1]
. . .
R[9]=$R_H[8]$\*R[8]
R'[0]=$R_H[9]$\*R[9], where I is an identity matrix.

If there is no matching or motion estimation error, R'[0] should be an identity matrix like R[0]. In reality, R'[0] is not an identity matrix because of the matching and motion estimation errors. For images P[0] to P[9] to be seamlessly stitched, the computer must make R'[0]=R[0]=I.

If R'[0]*ΔR=R[0]=I, then ΔR=(R'[0])$^{-1}$. ΔR is defined as the gross rotation error for matching and motion estimation. ΔR is the rotation necessary to rotate a calculated first image P'[0] to overlap the original first image P[0], where the calculated first image P'[0] is the first image P[0] rotated to be stitched to the last image P[9]. In other words, this is the rotation matrix needed to rotate the original first image P[0] to match the last image P[9] so they can be stitched together to from the 360 degree panoramic image. There is a need for an algorithm to spread the gross error ΔR in the stitched image so the last image P[9] can be stitched to the first image P[0].

Figure 2:
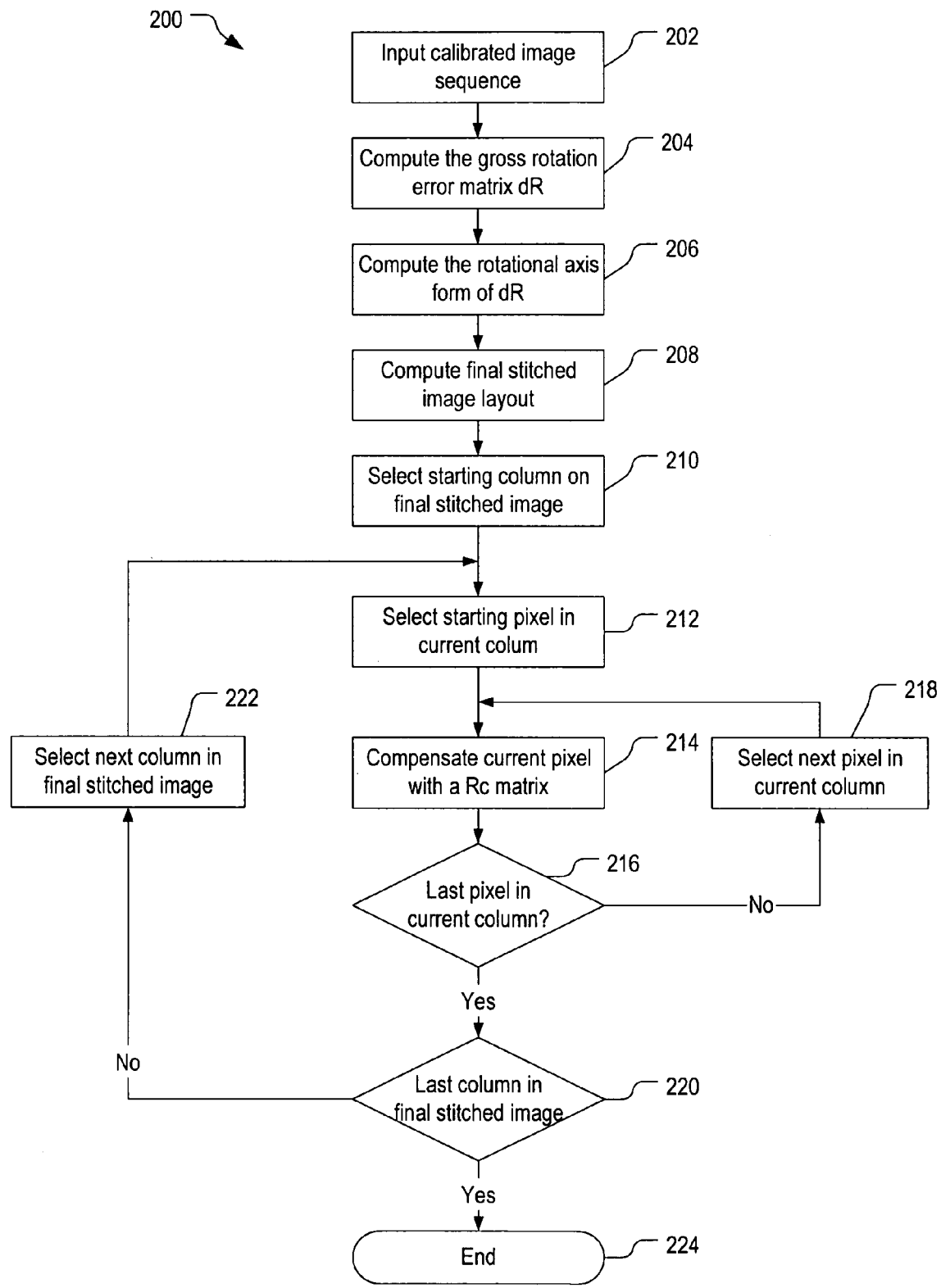
FIG. 2 illustrates a flowchart of a method to generate a 360 degree panoramic image in one embodiment of the invention.

FIG. 2 illustrates a method 200 to generate a 360 degree panoramic image in one embodiment of the invention. In action 202, the computer receives input of the image sequence (e.g., images P[0] to P[9] in FIG. 1). The camera focus length and relative rotation matrices between adjacent images have been previously determined by the computer as described in U.S. patent application Ser. No. 09/665,917.

In action 204, the computer calculates the gross rotational matrix ΔR from the relative rotation matrices using the following formula:

$$\Delta R = (R'[0])^{-1}.$$

ΔR is the relative rotation matrix between the original first image P[0] and the calculated first image P'[0] that can be stitched to the last image P[9].

In action 206, the computer calculates the rotational axis form of the gross rotational matrix ΔR. The rotational axis form is defined by a rotation axis and a rotational angle as follows:

$$R = \begin{bmatrix} n_1^2 + (1-n_1^2)\cos\theta & n_1 n_2 (1-\cos\theta) - n_3\sin\theta & n_1 n_3 (1-\cos\theta) + n_2\sin\theta \\ n_1 n_2 (1-\cos\theta) + n_3\sin\theta & n_2^2 + (1-n_2^2)\cos\theta & n_2 n_3 (1-\cos\theta) - n_1\sin\theta \\ n_1 n_3 (1-\cos\theta) - n_2\sin\theta & n_2 n_3 (1-\cos\theta) + n_1\sin\theta & n_3^2 + (1-n_3^2)\cos\theta \end{bmatrix}.$$

Figure 3A:
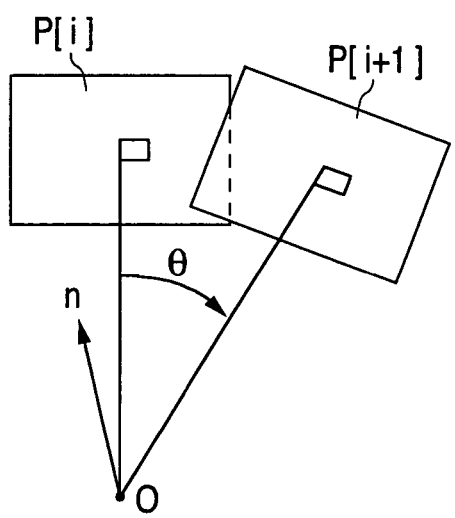
FIG. 3A illustrates the relative rotation between two adjacent images where the rotation is represented by a rotational axis and a rotational angle in one embodiment.

As shown in FIG. 3A, θ is the rotation angle between from image P[i] to image P[i+1] (where i is a variable) and n=[$n_1$, $n_2$, $n_3$]$^T$ is the rotation axis (i.e., a unit directional vector) started from origin O.

Figure 3B:
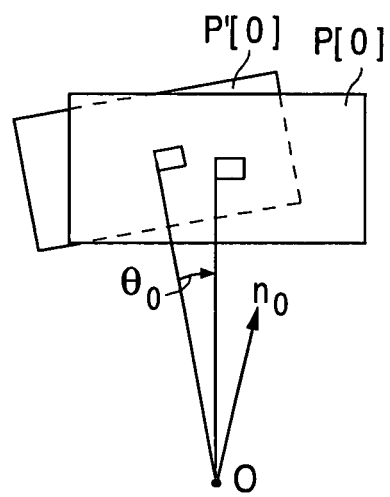
FIG. 3B illustrates the relative rotation between two an original first image and a rotated first image that can be stitched to the last image where the rotation is represented by a rotational axis and a rotational angle in one embodiment.

As shown in FIG. 3B, $\theta_0$ is the rotation angle from the calculated first image P'[0] to the original first image P[0], and $n_0$ is the rotation axis. Since multiple relative rotation matrices are known from action 202 (e.g., $R_H[0]$ to $R_H[9]$), $n_0$ and $\theta_0$ can be calculated by solving the above 4-parameter rotation matrix R equation for these relative rotation matrices.

In action 208, the computer computes the size of cylindrical surface 102 (i.e., the size of the final 360 panoramic image). The size of cylindrical surface 102 is determined by its radius, which can be arbitrary. In one embodiment, the user sets the radius by selecting (1) the average focal length, (2) ½ of the average focal length, and (3) ¼ of the average focal length.

Figure 4:
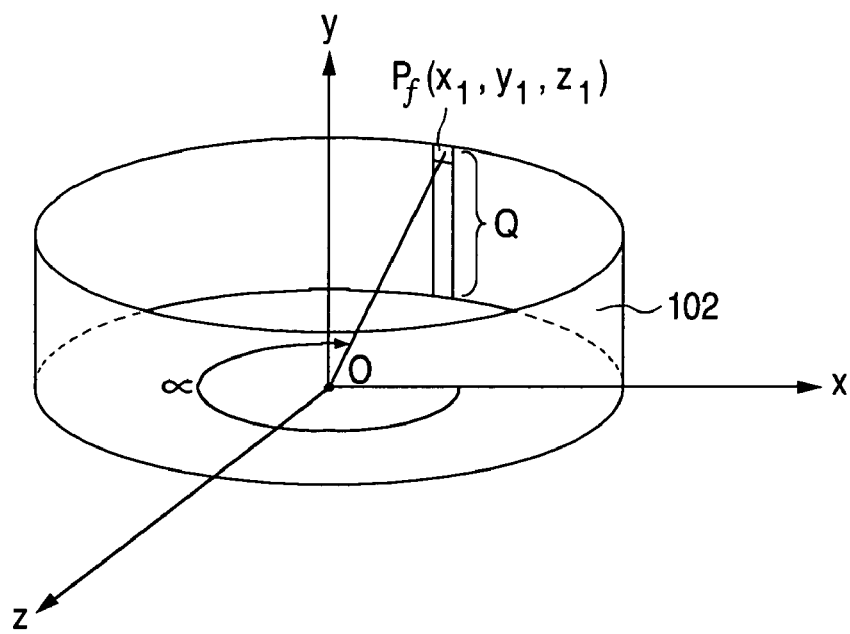
FIG. 4 illustrates an angle of a column on the cylindrical surface used to calculate a compensation rotation matrix $R_c$ in one embodiment.

In action 210, the computer selects a starting column Q (FIG. 4) on cylindrical surface 102.

In action 212, the computer selects a starting pixel $P_f$ (FIG. 4) in the selected column. Pixel $P_f$ has a position of ($x_1$, $y_1$, $z_1$).

In action 214, the computer compensates current pixel $P_f$ (i.e., the selected pixel) with a rotational compensation matrix $R_c$ matrix. The rotational compensation matrix $R_c$ for pixel $P_f$ can be used for all the pixels in the same column (e.g., all the pixels in selected column Q) to reduce the computational cost. Rotational compensation matrix $R_c$ is the gross rotational matrix ΔR spread out among each of the columns on cylindrical surface 102. As unit directional vector $n_0$ and rotational angle $\theta_0$ are calculated in action 206, then the compensation rotation matrix $R_c$ can be defined as:

$$R_c(\alpha) = R\left(\frac{\alpha}{2\pi}\theta_0\right)$$

$$= \begin{bmatrix} n_1^2 + (1-n_1^2)\cos\left(\frac{\alpha}{2\pi}\theta_0\right) & n_1 n_2 (1-\cos\theta) - n_3\sin\left(\frac{\alpha}{2\pi}\theta_0\right) & n_1 n_3 (1-\cos\theta) + n_2\sin\left(\frac{\alpha}{2\pi}\theta_0\right) \\ n_1 n_2 \left(1-\cos\left(\frac{\alpha}{2\pi}\theta_0\right)\right) + n_3\sin\left(\frac{\alpha}{2\pi}\theta_0\right) & n_2^2 + (1-n_2^2)\cos\left(\frac{\alpha}{2\pi}\theta_0\right) & n_2 n_3 (1-\cos\theta) - n_1\sin\left(\frac{\alpha}{2\pi}\theta_0\right) \\ n_1 n_3 \left(1-\cos\left(\frac{\alpha}{2\pi}\theta_0\right)\right) - n_2\sin\left(\frac{\alpha}{2\pi}\theta_0\right) & n_2 n_3 \left(1-\cos\left(\frac{\alpha}{2\pi}\theta_0\right)\right) + n_1\sin\left(\frac{\alpha}{2\pi}\theta_0\right) & n_3^2 + (1-n_3^2)\cos\left(\frac{\alpha}{2\pi}\theta_0\right) \end{bmatrix}$$

Angle α (FIG. 4) is the rotation angle of current column Q in the XZ plane, which is determined by the arctangent of $x_1/z_1$ of current pixel $P_f$.

Figure 5:
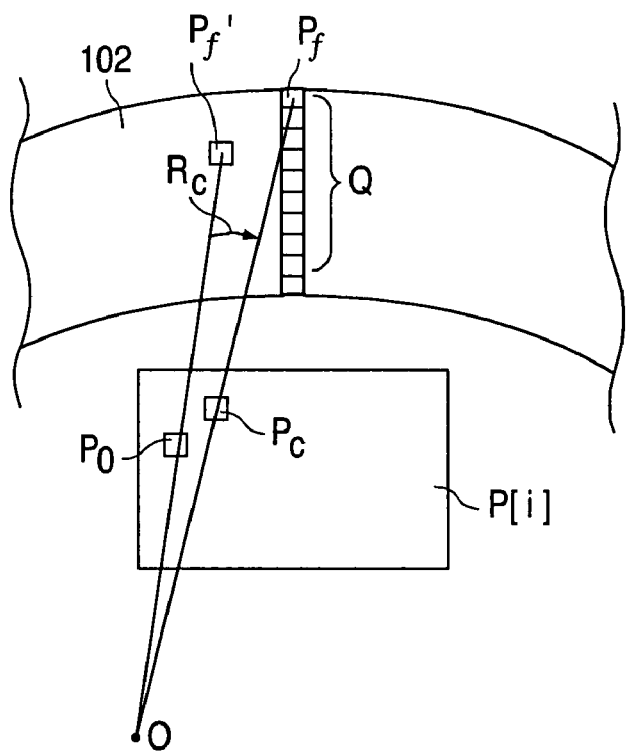
FIG. 5 illustrates the compensation of a pixel on the cylindrical surface using the compensation rotation matrix $R_c$ in one embodiment.

FIG. 5 shows that the computer traces the current pixel $P_f$ back to origin O to determine a ray $OP_f$ that passes through the current pixel $P_f$ and a pixel $P_c$ on the original stitched images. The computer then determines a ray $OP_f'$ that would have been rotated by compensation matrix $R_c(\alpha)$ to coincide with ray $OP_f$. The computer traces ray $OP_f'$ to its intersection with the original stitched picture to find a pixel $P_o$. The computer then paints the pixel color values of pixel $P_o$ to the current pixel $P_f$ on the final stitched images 102.

In action 216, the computer determines if the current pixel $P_f$ is the last pixel in the current column Q. If it is not, action 216 is followed by action 218. If the current pixel $P_f$ is the last pixel in the current column Q, then action 216 is followed by action 220.

In action 218, the computer selects a next pixel in the current column. Action 218 is followed by action 214 and the above actions cycle until all the pixels in the current column have been compensated.

In action 220, the computer determines if the current column in the last column on cylindrical surface 102. If it is not, action 220 is followed by action 222. If the current column is the last column, then action 220 is followed by action 224, which ends method 200.

In action 222, the computer selects a next column on cylindrical surface 102. Action 222 is followed by action 212 and the above actions cycle until all the pixels in all the columns have been compensated.

One embodiment of method 200 implemented in pseudo code is provided in the attached index.

Various other adaptations and combinations of features of the embodiments disclosed are within the scope of the invention. Numerous embodiments are encompassed by the following claims.

```
Index
for(x1 = count - 1; x1 > 0; x1 --)
{
    pR1 = &(pMatrix->GetElement(x1 % count, 0)->Rotate);
    *pR1 = pMatrix->GetElement(x1 - 1, 0)->RotateH;
    for(x2=count - 1; x2 > x1; x2--)
    {
        pR2 = &(pMatrix->GetElement(x2 % count, 0)->Rotate);
        Mul(pR1, pR2, &R3);
        *pR2 = R3;
    }
}
pR1 = &(pMatrix->GetElement(0, 0)->Rotate);
identity(pR1);
double* A = new double[3 * 3];
pR1 = &(pMatrix->GetElement(count - 1, 0)->Rotate);
pR2 = &(pMatrix->GetElement(count - 1, 0)->RotateH);
Mul(pR1, pR2, &R3);
*(A) = R3.r11;                          //A = inv(pR1);
*(A+1) = R3.r21;
*(A+2) = R3.r31;
*(A+3) = R3.r12;
*(A+4) = R3.r22;
*(A+5) = R3.r32;
*(A+6) = R3.r13;
*(A+7) = R3.r23;
*(A+8) = R3.r33;
● 3×3 orthogonal matrix "rotation axis" representation
The following two functions implemented the conversion between an
orthogonal matrix and it's "rotation axis" representation.
////////////////////////////////////////////////////
//
// A unit orthogonal matrix(3×3) represented by the rotation axis and
// the rotation angle
// 1. [A]3×3 is the input unit orthogonal matrix;
// 2. [n]3×1 is the output rotation axis;
// 3. *pDegree is the output rotation angle;
// 4. Return value is TRUE if success,
// or else is TRUE.
//
////////////////////////////////////////////////////
BOOL UOM2AxisAngle(double *A, double *n, double *pDegree)
{
    const double PI = 3.1415926;
    double d1, d2, d3;
    d1 = *(A+4) + *(A+8) - 1.0;
    d2 = *(A) + *(A+8) - 1.0;
    d3 = *(A) + *(A+4) - 1.0;
    if(*(A) < d1 || *(A+4) < d2 || *(A+8) < d3)
    {
        *n = 1.0;
        *(n+1) = 0.0;
        *(n+2) = 0.0;
        *pDegree = 0.0;
        return TRUE;
    }
    double trace, cs, ss;
    trace = MatrixTrace(A, 3);
    cs = (trace - 1.0)/2.0;
    if(cs == 1.0)
    {
        *n = 1.0;
        *(n+1) = 0.0;
        *(n+2) = 0.0;
        *pDegree = 0.0;
    }
    else if(cs == -1.0)
    {
        *n = 1.0;
        *(n+1) = 0.0;
        *(n+2) = 0.0;
        *pDegree = 3.14;
```

```
Index -continued
    }
    else
    {
        *pDegree = acos(cs);
        ss = sin(*pDegree);
        double temp = ss * 2.0;
        *n = (*(A+7) - *(A+5))/temp;         //A(3, 2) - A(2, 3)
        *(n+1) = (*(A+2) - *(A+6))/temp;     //A(1, 3) - A(3, 1)
        *(n+2) = (*(A+3) - *(A+1))/temp;     //A(2, 1) - A(1, 2)
    }
    double norm = sqrt(*n * *n + *(n+1)* *(n+1) + *(n+2)* *(n+2));
    *n = *n/norm;
    *(n+1) = *(n+1)/norm;
    *(n+2) = *(n+2)/norm;
    if((*pDegree > PI/4.0) || (*pDegree <- PI/4.0))
        *pDegree = 0.0;
    return TRUE;
}
////////////////////////////////////////////////////
//
// Using a rotation axis and a rotation angle can generate
// a unit orthogonal matrix(3×3)
// 1. [A]3×3 is the output unit orthogonal matrix;
// 2. [n]3×1 is the input rotation axis, n should be a unit vector;
// 3. degree is the input rotation angle.
//
////////////////////////////////////////////////////
void AxisAngle2UOM(double *A, double *n, double degree)
{
    double cs, ss, temp;
    double n11, n12, n13, n22, n23, n33;
    cs = cos(degree);
    ss = sin(degree);
    temp 1.0 - cs;
    n11 = *(n)* *(n);
    n12 = *(n)* *(n+1);
    n13 = *(n)* *(n+2);
    n22 = *(n+1)* *(n+1);
    n23 = *(n+1)* *(n+2);
    n33 = *(n+2)* *(n+2);
    *(A) = n11 * temp + cs;
    *(A+1) = n12 * temp - *(n+2) * ss;
    *(A+2) = n13 * temp + *(n+1) * ss;
    *(A+3) = n12 * temp + *(n+2) * ss;
    *(A+4) = n22 * temp + cs;
    *(A+5) = n23 * temp - *(n) * ss;
    *(A+6) = n13 * temp - *(n+1) * ss;
    *(A+7) = n23 * temp + *(n) * ss;
    *(A+8) = n33 * temp + cs;
}
● Calculate the final stitch image layout
In this step, we apply scan line technology to compute
the final stitch image layout for the
coming backward pixel-rendering algorithm.
The layout datum is stored in the following structures.
struct LineSegment
{
    LONG e1; // start point
    LONG e2; // end point
};
struct DLineSegment
{
    double e1;                              // start degree
    double e2;                              // end degree
};
class CScanRegion
{
public:
    // Region dimensions
    RECT rect;
    // Convenience points
    LineSegment* pSegH0;
    LineSegment* pSegV0;
    DLineSegment* pSegD0;
protected:
    // Buffer headers
    LineSegment* pSegH;
```

-continued

Index

```
    LineSegment* pSegV;
    DLineSegment* pSegD;
public:
    CScanRegion( );
    ~CScanRegion( );
    Create(RECT rcRegion);
};
● Compensate the current pixel with R_C matrices
    LONG y_e1 = pScan[c].pSegV0[x].e1;
    LONG y_e2 = pScan[c].pSegV0[x].e2;
    double d_e1 = pScan[c].pSegD0[x].e1;
    double d_e2 = pScan[c].pSegD0[x].e2;
    double theta;
    if(fabs(d_e2 - d_e1) < 1.0e-2)
        theta = 0.0;
    else
        theta = (d_e2 - d_e1)/(y_e2 - y_e1);
    LONG x_wrap = x;
```

-continued

Index

```
for (y = y_e1; y <= y_e2; y++)
{
    pict.x = x_wrap;
    pict.y = y;
    CartesianCoord cart1, cart2;
    Picture2Cartesian(&pict, &cart1);
    double* A = new double[3*3];
    AxisAngle2UOM(A, pAxis d_e1 + (y - y_e1) * theta);
    if(fabs(Degree) > 1.0e-6)
    {
        double delta = (d_e1 + (y - y_e1) * theta)/Degree;
        cart2.x = pict.r * sin(delta * 2 * PI);
        cart2.z = -pict.r * cos(delta * 2 * PI);
        cart2.y =
            (cart1.y - *(A+3) * cart2.x - *(A+5) * cart2.z)/*(A+4);
        Cartesian2Picture(&cart2, &pict);
    }
    else
    {
        cart2.x = *A * cart1.x + *(A+3) * cart1.y + *(A+6) * cart1.z;
        cart2.y =
            *(A+1) * cart1.x + *(A+4) * cart1.y + *(A+7) * cart1.z;
        cart2.z =
            *(A+2) * cart1.x + *(A+5) * cart1.y + *(A+8) * cart1.z;
        Cartesian2Picture(&cart2, &pict);
    }
    delete [ ] A;
}
Picture2RealFilm(&pict, &film, R);
```

What is claimed is:

1. A method for creating a 360 degree panoramic image from a plurality of images, comprising:

arranging the images around a camera optical center and projecting the arranged images onto a cylindrical surface to generate the 360 degree panoramic image;

determining a gross rotation error ΔR between a first image and a last image from the arranged images, wherein the gross rotation error ΔR is a rotation necessary to rotate the first image to match the last image; and dividing the gross rotation error ΔR among all columns of pixels in the 360 degree panoramic image, comprising:

for each column, determining a compensation matrix $R_c$ for the column using a rotation angle $\theta_0$ and rotation axis $n_0$ of the gross rotation error ΔR, and a rotation angle α of the column; and for each pixel in each column, replacing the pixel with a corresponding pixel identified by the compensation matrix $R_c$ for the column.

2. The method of claim 1, wherein said determining a compensation matrix $R_c$ for the column comprises using the following formula:

$$R_c(\alpha) = \begin{bmatrix} n_1^2 + (1-n_1^2)\cos\left(\frac{\alpha}{2\pi}\theta_0\right) & n_1 n_2(1-\cos\theta) - n_3\sin\left(\frac{\alpha}{2\pi}\theta_0\right) & n_1 n_3(1-\cos\theta) + n_2\sin\left(\frac{\alpha}{2\pi}\theta_0\right) \\ n_1 n_2\left(1-\cos\left(\frac{\alpha}{2\pi}\theta_0\right)\right) + n_3\sin\left(\frac{\alpha}{2\pi}\theta_0\right) & n_2^2 + (1-n_2^2)\cos\left(\frac{\alpha}{2\pi}\theta_0\right) & n_2 n_3(1-\cos\theta) - n_1\sin\left(\frac{\alpha}{2\pi}\theta_0\right) \\ n_1 n_3\left(1-\cos\left(\frac{\alpha}{2\pi}\theta_0\right)\right) - n_2\sin\left(\frac{\alpha}{2\pi}\theta_0\right) & n_2 n_3\left(1-\cos\left(\frac{\alpha}{2\pi}\theta_0\right)\right) + n_1\sin\left(\frac{\alpha}{2\pi}\theta_0\right) & n_3^2 + (1-n_3^2)\cos\left(\frac{\alpha}{2\pi}\theta_0\right) \end{bmatrix},$$

where the rotation axis $n_0$ is $[n_1, n_2, n_3]^T$.

3. The method of claim 2, further comprising using a plurality of relative rotation matrices between adjacent images from the arranged images to calculated the rotation angle $\theta_0$ and the rotation axis $n_0$.

4. The method of claim 2, wherein said replacing the pixel with a corresponding pixel comprises:

tracing the pixel in the column on the 360 degree panoramic image to the camera optical center of the arranged images to form a first ray;

determining a second ray originating from the camera optical center that would be rotated by the compensation matrix $R_c$ to coincide with the first ray; and tracing the second ray to an intersection with the corresponding pixel on one of the arranged images; and painting the pixel with color values of the corresponding pixel.

5. A method for creating a 360 degree panoramic image from a plurality of images, comprising:

determining a gross rotation error ΔR between a first image and a last image, wherein the gross rotation error ΔR is a rotation necessary to rotate the first image to match the last image;

determining a rotation angle $\theta_0$ and a rotation axis $n_0$ for the gross rotation error ΔR, comprising using a plurality of relative rotation matrices between adjacent images from the plurality of images to calculated the rotation angle $\theta_0$ and the rotation axis $n_0$;

determining a rotation angle α of a column on the 360 degree panoramic image;

determining a compensation matrix $R_c$ for each column using the following formula:

$$R_c(\alpha) = \begin{bmatrix} n_1^2 + (1-n_1^2)\cos\left(\frac{\alpha}{2\pi}\theta_0\right) & n_1 n_2(1-\cos\theta) - n_3\sin\left(\frac{\alpha}{2\pi}\theta_0\right) & n_1 n_3(1-\cos\theta) + n_2\sin\left(\frac{\alpha}{2\pi}\theta_0\right) \\ n_1 n_2\left(1-\cos\left(\frac{\alpha}{2\pi}\theta_0\right)\right) + n_3\sin\left(\frac{\alpha}{2\pi}\theta_0\right) & n_2^2 + (1-n_2^2)\cos\left(\frac{\alpha}{2\pi}\theta_0\right) & n_2 n_3(1-\cos\theta) - n_1\sin\left(\frac{\alpha}{2\pi}\theta_0\right) \\ n_1 n_3\left(1-\cos\left(\frac{\alpha}{2\pi}\theta_0\right)\right) - n_2\sin\left(\frac{\alpha}{2\pi}\theta_0\right) & n_2 n_3\left(1-\cos\left(\frac{\alpha}{2\pi}\theta_0\right)\right) + n_1\sin\left(\frac{\alpha}{2\pi}\theta_0\right) & n_3^2 + (1-n_3^2)\cos\left(\frac{\alpha}{2\pi}\theta_0\right) \end{bmatrix},$$

where the rotation axis $n_0$ is $[n_1, n_2, n_3]^T$;

tracing a first pixel in the column to a camera optical center of the plurality of images to form a first ray;

determining a second ray originating from the camera optical center that would be rotated by the compensation matrix $R_c$ to coincide with the first ray;

tracing the second ray to an intersection with a second pixel on one of the plurality of images;

painting the first pixel with color values of the second pixel;

repeating said tracing a first pixel, said determining a second ray, said tracing the second ray, and said painting for other pixels in the column the compensation matrix $R_c$; and repeating said determining a rotation angle $\alpha$, said determining a compensation matrix $R_c$, said tracing a first pixel, said determining a second ray, said tracing the second ray, and said painting for other columns on the 360 degree panoramic image.

* * * * *